(12) United States Patent
Maluf et al.

(10) Patent No.: US 10,853,499 B2
(45) Date of Patent: Dec. 1, 2020

(54) KEY THREAT PREDICTION

(71) Applicant: Cisco Technology, Inc., San Jose, CA (US)

(72) Inventors: David A. Maluf, Mountain View, CA (US); Raghuram S. Sudhaakar, Fremont, CA (US); Nancy Cam-Winget, Mountain View, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 233 days.

(21) Appl. No.: 15/949,560

(22) Filed: Apr. 10, 2018

(65) Prior Publication Data

US 2019/0171823 A1 Jun. 6, 2019

Related U.S. Application Data

(60) Provisional application No. 62/595,282, filed on Dec. 6, 2017.

(51) Int. Cl.
*G06F 21/57* (2013.01)
*G06N 20/00* (2019.01)
*G06F 21/55* (2013.01)

(52) U.S. Cl.
CPC .......... *G06F 21/577* (2013.01); *G06F 21/552* (2013.01); *G06N 20/00* (2019.01); *G06F 2221/034* (2013.01)

(58) Field of Classification Search
CPC ................. G06F 21/577; G06F 21/552; G06F 2221/034; G06N 20/00
See application file for complete search history.

(56) References Cited

U.S. PATENT DOCUMENTS

| 7,634,091 | B2 | 12/2009 | Zhou et al. | |
|---|---|---|---|---|
| 8,204,224 | B2 | 6/2012 | Xiao et al. | |
| 8,671,451 | B1 * | 3/2014 | Lambert | H04W 12/08 726/25 |
| 9,178,876 | B1 * | 11/2015 | Johansson | H04L 9/085 |
| 9,336,381 | B1 | 5/2016 | Kane-Parry et al. | |

(Continued)

OTHER PUBLICATIONS

Basicevic, et al., "Evaluation of entropy-based detection of outbound denial-of-service attacks in edge networks", Security and Communication Networks, Wiley Online Library, DOI: 10.1002/sec.1040, Faculty of Technical Sciences, John Wiley & Sons, Ltd., May 26, 2014, 8 pgs.

(Continued)

*Primary Examiner* — Ayoub Alata
(74) *Attorney, Agent, or Firm* — Edell, Shapiro & Finnan, LLC

(57) ABSTRACT

In one example embodiment, a network-connected device provides or obtains one or more computer network communications protected by a key. The network-connected device determines a count of the one or more computer network communications according to one or more properties of the one or more computer network communications. Based on the count of the one or more computer network communications, the network-connected device computes an information entropy of the key. Based on the information entropy of the key, the network-connected device dynamically generates a predicted threat level of the key.

20 Claims, 17 Drawing Sheets

(56) References Cited

U.S. PATENT DOCUMENTS

| | | | |
|---|---|---|---|
| 2009/0240804 A1* | 9/2009 | Zhao | H04L 12/1877 709/224 |
| 2014/0304798 A1* | 10/2014 | Iyengar | H04L 63/1458 726/11 |
| 2016/0359881 A1 | 12/2016 | Yadav et al. | |

OTHER PUBLICATIONS

David A. Maluf, "Monotonicity of Entropy Computations in Belief Functions", Intelligent Data Analysis, Elsevier Science B.V., Dec. 1997, 7 pages.

Jiming Liu et al., "A New Uncertainty Measure for Belief Networks with Applications to Optimal Evidential Inferencing", IEEE Transactions on Knowledge and Data Engineering, vol. 13, No. 3, May/Jun. 2001, 10 pages.

Federal Aviation Administration, "Performance Data Analysis and Reporting System (PDARS)", 3 pages, Aug. 14, 2015; https://www.faa.gov/about/office_org/headquarters_offices/ato/service_units/systemops/perf_analysis/perf_tools/.

David A. Maluf et al., "On Space Exploration and Human Error", Source of Acquisition NASA Ames Research Center, 6 pages, Jan. 1, 2005; https://ntrs.nasa.gov/search.jsp?R=20060016368.

\* cited by examiner

200

| Name | % Life | Expires |
|---|---|---|
| key_1 | 10% | mm/dd/yyyy |
| key_2 | 0% | mm/dd/yyyy |
| key_3 | 52% | mm/dd/yyyy |
| key_4 | 78% | mm/dd/yyyy |
| ⋮ | ⋮ | ⋮ |

FIG.2

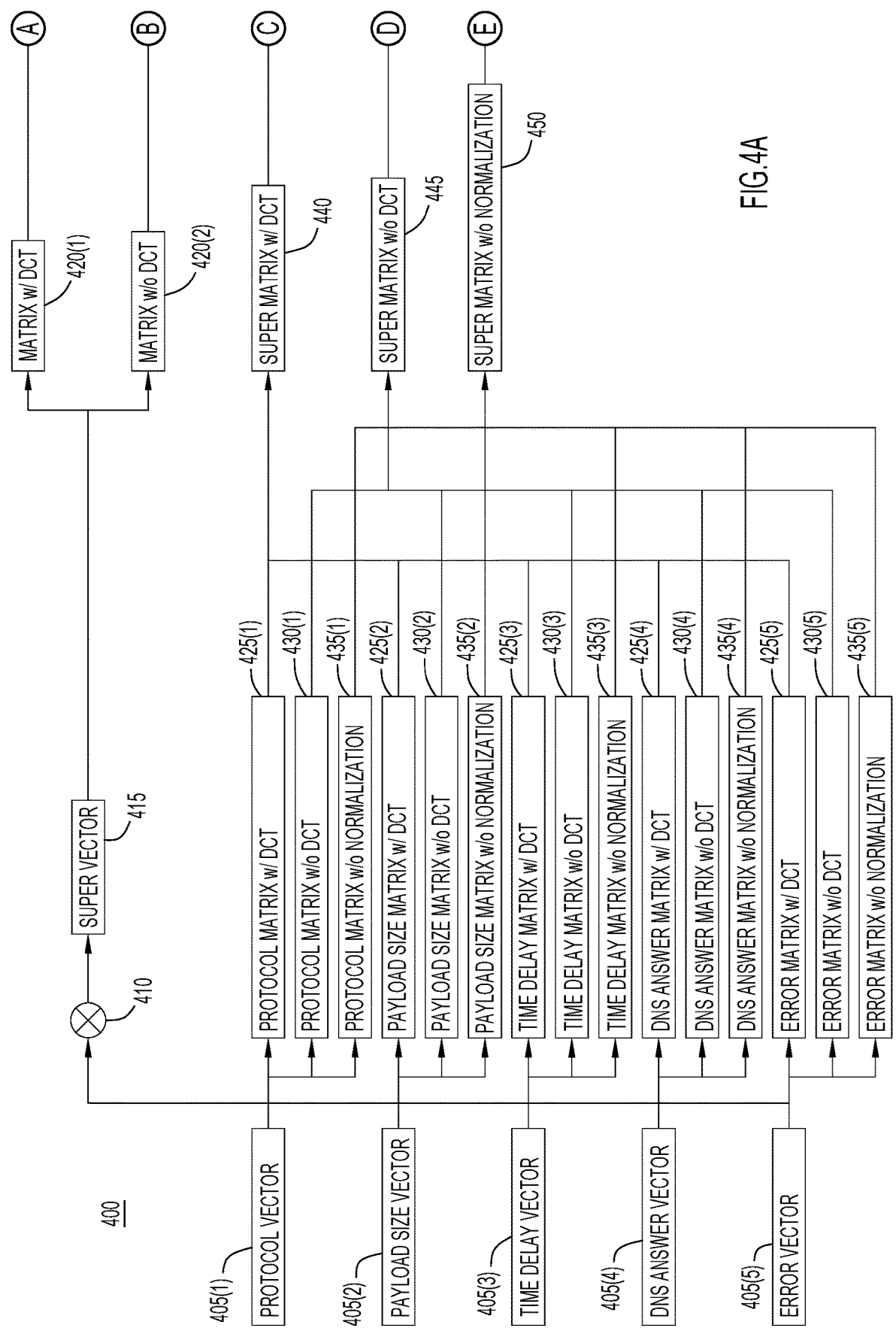

| PROTOCOL | TCP/443 | UDP/443 | TCP/563 | UDP/563 | TCP/993 | UDP/993 | TCP/995 | UDP/995 | TCP/989 | UDP/989 | OTHER |
|---|---|---|---|---|---|---|---|---|---|---|---|
| COUNT | 45333 | 0 | 0 | 0 | 0 | 0 | 0 | 0 | 0 | 0 | 0 |

| SIZE  | 0     | 2 | 4 | 8 | 16 | 32  | 64   | 128  | 256 | 1024 | 1500  |
|-------|-------|---|---|---|----|-----|------|------|-----|------|-------|
| COUNT | 22756 | 1 | 4 | 3 | 2  | 128 | 2259 | 1035 | 941 | 0    | 17536 |

405(2)

2.275600000000000e+04
1.000000000000000e+00
4.000000000000000e+00
3.000000000000000e+00
2.000000000000000e+00
1.280000000000000e+02
2.259000000000000e+03
1.035000000000000e+03
9.410000000000000e+02
0.000000000000000e+00
1.753600000000000e+04

| 700 | | | | | | | | | | | |
|---|---|---|---|---|---|---|---|---|---|---|---|
| TIME | 0 | 10 | 30 | 60 | 90 | 120 | 300 | 600 | 1800 | 3600 | MORE |
| COUNT | 0 | 1220 | 480 | 360 | 0 | 0 | 0 | 1200 | 0 | 0 | 0 |

405(3)

0.000000000000000e+00
1.220000000000000e+03
4.800000000000000e+02
3.600000000000000e+02
0.000000000000000e+00
0.000000000000000e+00
0.000000000000000e+00
1.200000000000000e+03
0.000000000000000e+00
0.000000000000000e+00
0.000000000000000e+00

| PORT | TCP/443 | UDP/443 | TCP/563 | UDP/563 | TCP/993 | UDP/993 | TCP/995 | UDP/995 | TCP/989 | UDP/989 |
|---|---|---|---|---|---|---|---|---|---|---|
| COUNT | 44000 | 0 | 0 | 0 | 0 | 0 | 0 | 0 | 0 | 0 |

800

405(4)

900A

| HEADER | TCP/443 | UDP/443 | TCP/563 | TCP/993 | UDP/993 | TCP/995 | UDP/995 | TCP/989 | UDP/989 | OTHER |
|---|---|---|---|---|---|---|---|---|---|---|
| COUNT | 9 | 0 | 0 | 0 | 0 | 0 | 0 | 0 | 0 | 0 |

| HEADER | TCP/443 | UDP/443 | TCP/563 | TCP/993 | UDP/993 | TCP/995 | UDP/995 | TCP/989 | UDP/989 | OTHER |
|---|---|---|---|---|---|---|---|---|---|---|
| COUNT | 9 | 0 | 9 | 0 | 0 | 0 | 0 | 0 | 0 | 0 |

| HEADER | TCP/443 | UDP/443 | TCP/563 | TCP/993 | UDP/993 | TCP/995 | UDP/995 | TCP/989 | UDP/989 | OTHER |
|---|---|---|---|---|---|---|---|---|---|---|
| COUNT | 11 | 0 | 9 | 0 | 0 | 0 | 0 | 0 | 0 | 0 |

FIG.9C

| 1000 | | | | | | | | | |
|---|---|---|---|---|---|---|---|---|---|
| HEADER | TCP/443 | UDP/443 | TCP/563 | TCP/993 | UDP/993 | TCP/995 | UDP/995 | TCP/989 | UDP/989 | OTHER |
| COUNT | 5 | 0 | 4 | 0 | 0 | 0 | 0 | 0 | 0 | 0 |

KEY THREAT PREDICTION

CROSS REFERENCE TO RELATED APPLICATION

This application claims priority to U.S. Provisional Application No. 62/595,282 filed Dec. 6, 2017. The entirety of this application is incorporated herein by reference.

TECHNICAL FIELD

The present disclosure relates to computer security.

BACKGROUND

The Internet of Things (IoT) is a general term used to describe the addition of networking capabilities to physical objects or "things" that serve some purpose or function outside of solely computing and/or networking technologies (i.e., traditionally "unconnected" or "offline" devices), such as thermometers, refrigerators, lights, wristbands, and sensors. In general, these "things," sometimes referred to as IoT enabled-devices, IoT devices, or special purpose network-connected devices, are embedded with electronics, software, and network interfaces, which enable the physical objects to send and/or receive data packets over a network.

In cryptography, a "key" is information that determines the output of a cryptographic algorithm. Cryptographic algorithms are typically difficult to protect, and as such are often assumed to be known to the attacker. A key is often easier to protect than a cryptographic algorithm, and easier to change if compromised. As such, the security of a system usually relies on the security of the key.

BRIEF DESCRIPTION OF THE DRAWINGS

FIG. 2 illustrates an example notification of the predicted threat level of a key, according to an example embodiment.

FIGS. 4A and 4B together illustrate a flowchart for a calculation of the information entropy of a key, according to an example embodiment.

FIG. 5A is a table illustrating a histogram for an example protocol vector, and FIG. 5B illustrates the example protocol vector, according to an example embodiment.

FIGS. 9A-9C are tables illustrating respective histograms for alternative DNS answer vectors, according to an example embodiment.

FIG. 11 illustrates an example super vector, according to an example embodiment.

DESCRIPTION OF EXAMPLE EMBODIMENTS

Overview

Figure 1:
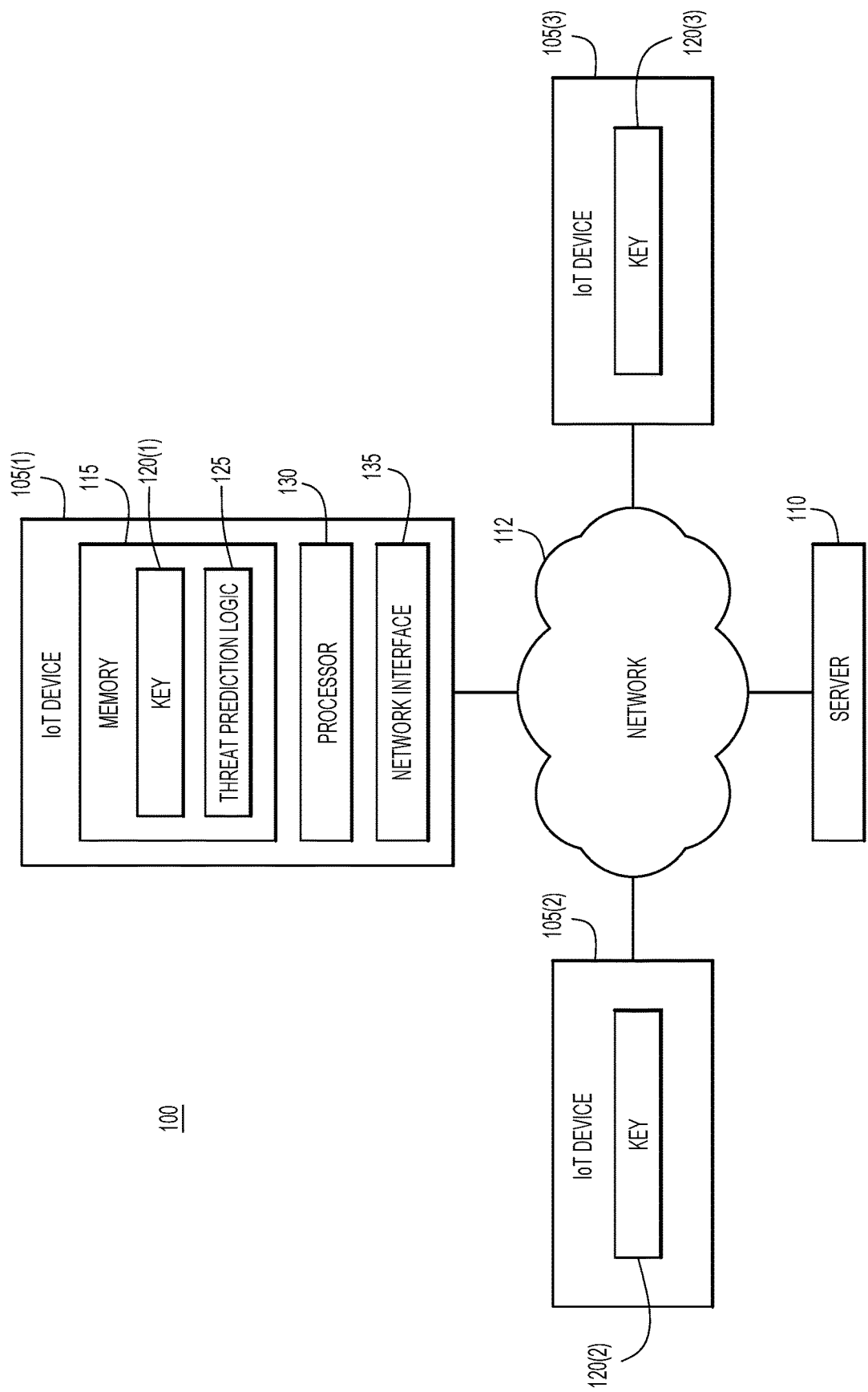
FIG. 1 is a block diagram of a system configured for key threat prediction, according to an example embodiment.

In one example embodiment, a network-connected device provides or obtains one or more computer network communications protected by a key. The network-connected device determines a count of the one or more computer network communications according to one or more properties of the one or more computer network communications. Based on the count of the one or more computer network communications, the network-connected device computes an information entropy of the key. Based on the information entropy of the key, the network-connected device dynamically generates a predicted threat level of the key. One or more of a variety of actions may be taken based on the predicted threat level of the key.

Example Embodiments

A secret key is the core underlying element for network security on a special purpose network-connected device. For a special purpose network-connected device to establish secure (e.g., standards-based) network communications, the device needs to securely protect its keys. However, due to the nature of special purpose network-connected device communications, keys face increasing threats of being broken/discovered. Many conventional security approaches focus on the vulnerability of the network session (or behavioral patterns of the network session) established or protected by the key, rather than the key itself.

Typically, the data payload sent by a special purpose network-connected device is constant and predictable. For example, a temperature sensor may periodically send temperature measurements. An attacker may exploit the predictability of the data payload without compromising or interfering with the special purpose network-connected device. Specifically, with a priori knowledge of the network communication algorithms and the data payload being transmitted, the cryptoanalysis search space of the attacker significantly reduces, as does the time required to break the key.

Moreover, there are problems associated with simply minimizing key reuse. The cost to maintain such a large system is typically very high. Maintenance carries the cost of a first layer management to change configuration/keys, followed by another independent management team to verify and validate the work of the first management team. Conventional techniques that focus on minimizing key reuse are static and prone to human error, which can lead to costly outcomes. Security products without an evolutionary strategy may eventually weaken as malicious approaches continue to evolve.

Because most special purpose network-connected devices are extremely resource constrained, a Hardware Security Module (HSM) and secure storage for the keys are cost prohibitive (both financially and in terms of memory/processing power). Therefore, key (e.g., private key) strength in conventional approaches is eroded over time and with use.

Keys used in special purpose network-connected device are inherently insecure, and will be broken if used a sufficient number of times. Conventionally, keys may be replaced periodically. However, this key replacement period is fairly arbitrary, and has associated risks that the keys may be broken. For example, if a key is replaced once every three months, but is used enough times in those three months, an attacker may break the key in just two months. In this example, the attacker may exploit the broken key for up to one month. This is a new threat to special purpose network-connected devices, especially to those using industry standards-based security mechanisms.

Accordingly, provided herein are systems and methods to ensure that keys are dynamically updated/replaced with sufficient frequency. With reference made to FIG. 1, shown is an example system 100 configured for key threat prediction. System 100 includes special purpose network-connected devices 105(1)-105(3), server 110, and a network 112 configured to enable communications between one or more of the special purpose network-connected devices 105(1)-105(3) and the server 110. Network 112 may include one or more of a Local Area Network (LAN), a Wide Area Network (WAN), a wireless network, and a wired network.

Special purpose network connected device 105(1) includes a memory 115 that stores a key 120(1) and threat prediction logic 125, one or more processors 130, and a network interface 135. Special purpose network-connected devices 105(2) and 105(3) also store, respectively, keys 120(2) and 120(3). In one example, special purpose network-connected devices 105(1)-105(3) (and keys 120(1)-120(3)) are identical.

The one or more processors 130 are configured to execute instructions stored in the memory 115 for the threat prediction logic 125. When executed by the one or more processors 130, the threat prediction logic 125 causes the special purpose network-connected device 105(1) to perform operations described herein. The network interface 135 is a network interface card (or multiple instances of such a device) or other network interface device that enables network communications on behalf of the special purpose network connected device 105(1) to send and/or receive data packets over a network.

The memory 115 may be read only memory (ROM), random access memory (RAM), magnetic disk storage media devices, optical storage media devices, flash memory devices, electrical, optical, or other physical/tangible memory storage devices. Thus, in general, the memory 115 may be one or more tangible (non-transitory) computer readable storage media (e.g., a memory device) encoded with software comprising computer executable instructions and when the software is executed (by the processor 130) it is operable to perform operations described herein.

The special purpose network-connected device 105(1) provides or obtains (e.g., sends or receives), over network 112, one or more computer network communications protected by key 120(1). For example, the special purpose network-connected device 105(1) sends/receives one or more encrypted computer network communications to/from the server 110. These encrypted computer network communications are encrypted or decrypted with key 120(1). That is, the special purpose network-connected device 105(1) may encrypt computer network communications using the key 120(1) and send the encrypted computer network communications to the server 110. Additionally, the special purpose network-connected device 105(1) may receive encrypted computer network communications from the server 110, and decrypt the encrypted computer network communications using the key 120(1).

The special purpose network-connected device 105(1) may dynamically generate a predicted threat level of the key 120(1). A predicted threat level of a key is a statistical percent probability of that key being broken. FIG. 2 shows an example list of keys 200 stored on special purpose network-connected device 105(1) and the corresponding percent life for four of the keys. Key 120(1) may be one of these four keys. In one example, percent life=100%−predicted threat level.

The respective predicted threat levels for the four keys are 10%, 0%, 52%, and 78%. The key having a predicted threat level of 78% is unlikely to have been broken (or to be broken in the near future), while the key having a predicted threat level of 0% is almost certain to have already been broken. The predicted threat levels may be dynamically generated. That is, rather than setting a static value for when to change the key (e.g., once every three months), special purpose network-connected device 105(1) may generate an alert, or a new key, once a threshold predicted threat level (e.g., 15%) is met. As shown, expiration dates may also be dynamically generated based on the respective predicted threat levels. The dynamic expiration dates may change/update over time in accordance with the predicted threat level.

The predicted threat level of key 120(1) may be statistically generated based on key usage (e.g., the number of times an attacker has observed the key). This cannot be known exactly, but may be estimated based on certain factors. These factors may include when the key has been observed by the user of special purpose network-connected device 105(1) (because of man in the middle attacks), as well as others. Because the predicted threat level of key 120(1) is statistically based, generating this predicted threat level may not require specific knowledge about any particular threat.

The predicted threat level of the key 120(1) may be based on an information entropy of the key 120(1). As used herein, the term "information entropy" refers to a dynamic value that is independent of key type and reflects the certainty of a key being compromised. "Information entropy" is used in reference to Information Theory, and is to be distinguished from "key entropy." Information entropy may be the order of the integral of the probability distribution function of the compromised key (e.g., key 120(1)). The term "key entropy," as used herein, refers to a static value that reflects the randomness/complexity of a key. The following description in reference to FIG. 3 further describes characteristics/features of key entropy and information entropy.

Figure 3:
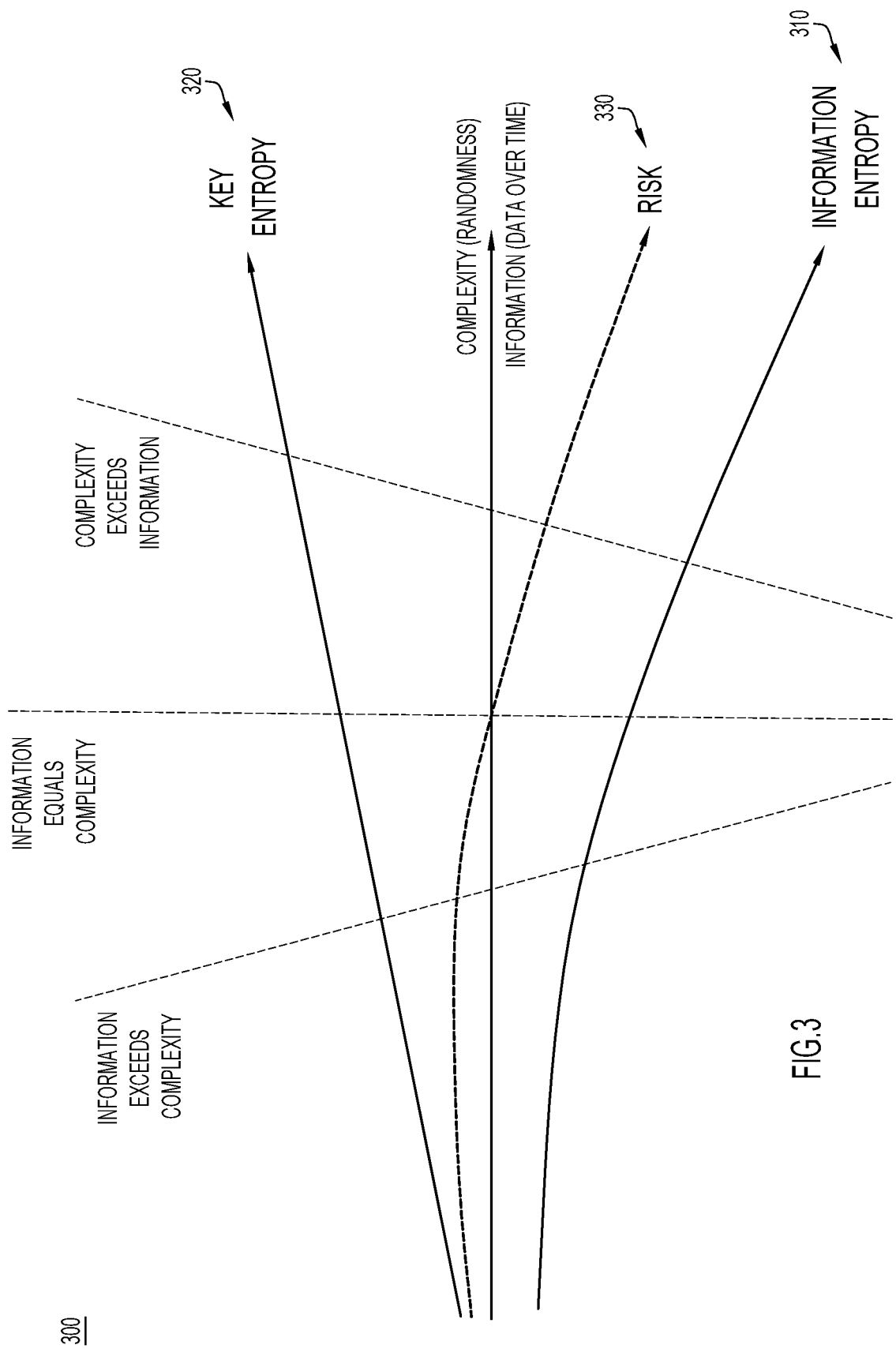
FIG. 3 is a plot illustrating the relationship between information entropy and key entropy, according to an example embodiment.

In particular, FIG. 3 illustrates the relationship between information entropy 310 and key entropy 320 for key 120(1) on a logarithmic plot 300. As shown, information entropy 310 and key entropy 320 have an inverse logarithmic relationship. In this context, key entropy 320 is a value that increases with the complexity of key 120(1), and information entropy 310 is a value that decreases as information relating to the key 120(1) becomes known. Since an attacker becomes more likely to break key 120(1) as more information relating to the key 120(1) becomes known, the predicted threat level of key 120(1) is inversely proportional to the information entropy 310 of key 120(1).

As shown on the left side of FIG. 3, if the complexity of key 120(1) is low, the key entropy 320 is also low, signaling that an attacker might easily break key 120(1). Meanwhile, as shown on the right side of FIG. 3, if the complexity of key 120(1) is high, the key entropy 320 is also high, signaling that an attacker might have difficulty breaking key 120(1). If key 120(1) is 32- or 64-bit, the key 120(1) has relatively low key entropy 320. If key 120(1) is 512- or 1024-bit, the key has relatively high key entropy 320.

As further shown on the left side of FIG. 3, if little information about the key 120(1) is known, the information entropy 310 is high, signaling that an attacker might not easily break the key 120(1). Meanwhile, as shown on the right side of FIG. 3, if much information about the key 120(1) is known, the information entropy 310 is low, signaling that an attacker might easily break key 120(1). As the key 120(1) is used in more communications, more information about key 120(1) becomes known, and therefore the information entropy 310 of key 120(1) decreases.

FIG. 3 also shows the risk 330 of the key being broken based on the key entropy 320 and information entropy 310. In one example, the risk 330 is equal or proportional to the difference between the key entropy 320 and the information entropy 310. When the magnitude of the information entropy 310 exceeds that of the key entropy 320 ("Information Exceeds Complexity"), the available information about the key 120(1) exceeds the strength/complexity of the key 120(1). In this case, the risk 330 is relatively high and key 120(1) should be replaced. When the magnitude of the key entropy 320 exceeds that of the information entropy 310 ("Complexity Exceeds Information"), the strength/complexity of the key 120(1) exceeds the available information of the key 120(1). In this case, risk 330 is relatively low and the key 120(1) does not need to be replaced. FIG. 3 also shows a middle point where the information of the key 120(1) equals the strength/complexity of the key 120(1).

The predicted threat level of key 120(1) may be based on the key entropy 320 of key 120(1) in addition to the information entropy 310 of key 120(1). For example, the predicted threat level of key 120(1) may be based on (e.g., proportional to) the risk 330 of the key being broken. In one example, the predicted threat level is equal to the risk 330 divided by the key entropy 320. Therefore, information entropy 310 and key entropy 320 may enable analysis of how keys are used by establishing a key usage behavioral model as a basis for detecting anomalies.

Figure 4B:
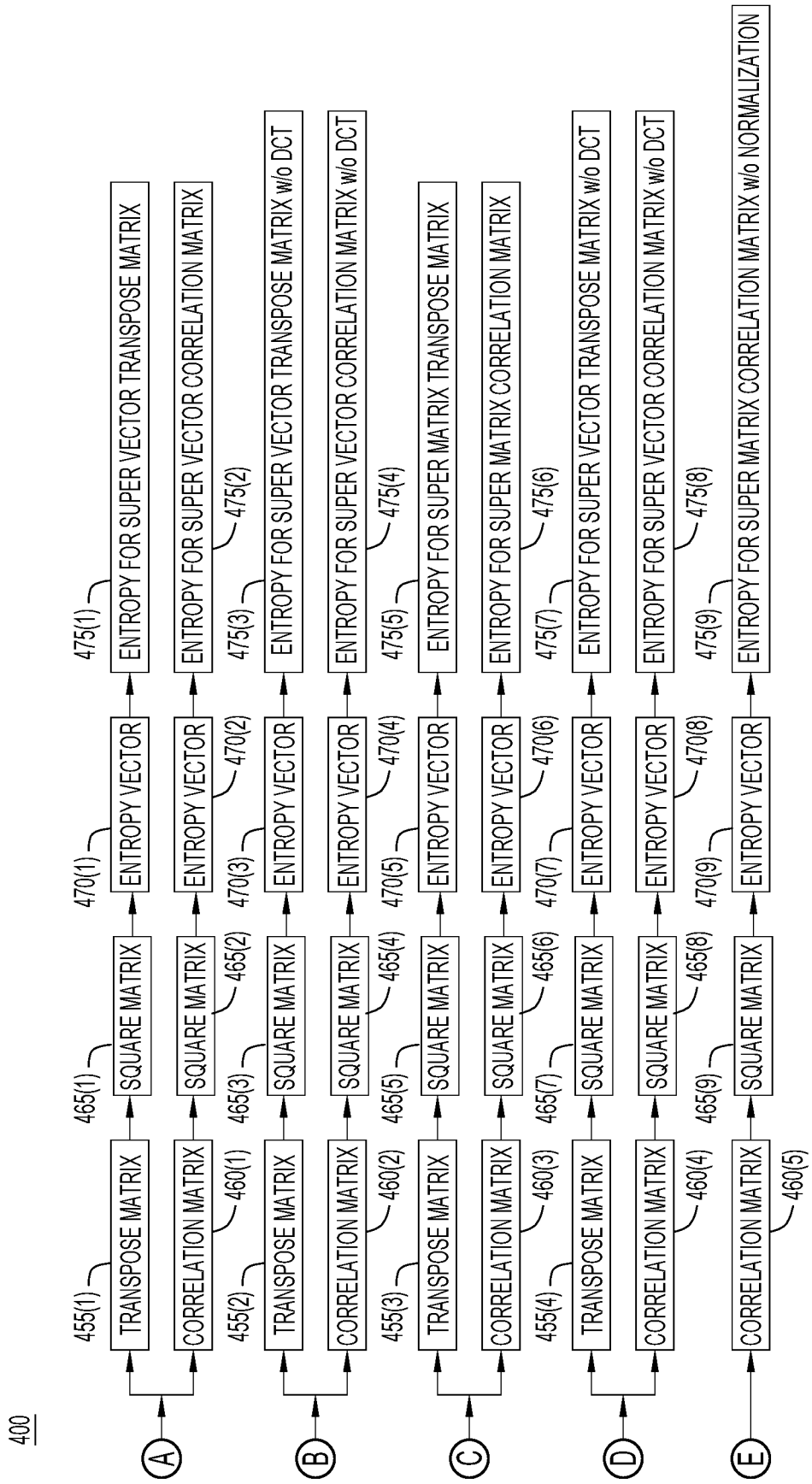

The special purpose network-connected device 105(1) may dynamically generate a predicted threat level of the key based on the information entropy of the key 120(1). FIGS. 4A and 4B together show a flowchart 400 of an example method for generating the predicted threat level. Special purpose network-connected device 105(1) may perform this method 400.

The method 400 involves performing operations on vectors 405(1)-405(5) to compute various information entropies for a key (e.g., key 120(1)). Vector 405(1) is a protocol vector, vector 405(2) is a payload size vector, vector 405(3) is a time delay vector, vector 405(4) is a Domain Name System (DNS) answer vector, and vector 405(5) is an error vector. Vectors 405(1)-405(5) relate to communications via Secure Sockets Layer (SSL)/Transmission Control Protocol (TCP) protocol.

Vectors 405(1)-405(5) are determined based on a count of one or more encrypted computer network communications between special purpose network-connected device 105(1) and server 110. Each vector 405(1)-405(5) may represent one or more properties of such encrypted computer network communications. Thus, method 400 may involve determining a count of one or more encrypted computer network communications according to one or more properties of the encrypted computer network communications.

One property of the encrypted computer network communications may include a protocol used for transporting the encrypted computer network communications and a source or destination port of the encrypted computer network communications. Protocol vector 405(1) may represent this information, as illustrated in FIGS. 5A and 5B. FIG. 5A is a table 500 illustrating a histogram for protocol vector 405(1), and FIG. 5B illustrates protocol vector 405(1). In this example, special purpose network-connected device 105(1) observed 45,333 encrypted computer network communications (e.g., packets) transported to or from TCP port 443. Special purpose network-connected device 105(1) observed no packets transported using other protocols/ports.

Figures 6A, 6B:
FIG. 6A is a table illustrating a histogram for an example payload size vector.
FIG. 6B illustrates the example payload size vector, according to an example embodiment.

Another property of the encrypted computer network communications may include a payload size of the encrypted computer network communications. Payload size vector 405(2) may represent this information, as illustrated in FIGS. 6A and 6B. FIG. 6A is a table 600 illustrating a histogram for payload size vector 405(2), and FIG. 6B illustrates payload size vector 405(2). In this example, special purpose network-connected device 105(1) observed 22,756 encrypted computer network communications (e.g., packets) having a payload size of zero, one packet having a payload size of one or two, four packets having a payload size of three or four, etc.

Figures 7A, 7B:
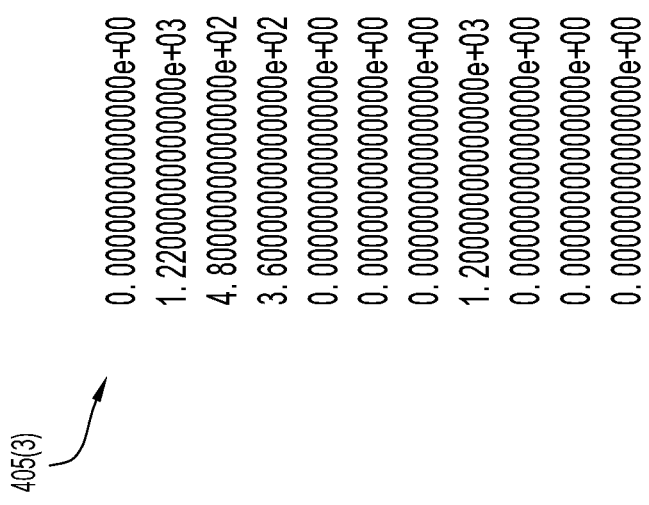
FIG. 7A is a table illustrating a histogram for an example time delay vector.
FIG. 7B illustrates the example time delay vector, according to an example embodiment.

Yet another property of the encrypted computer network communications may include a time delay in a packet sequence of the encrypted computer network communications. Time delay vector 405(3) may represent this information, as illustrated in FIGS. 7A and 7B. FIG. 7A is a table 700 illustrating a histogram for time delay vector 405(3), and FIG. 7B illustrates time delay vector 405(3). In this example, special purpose network-connected device 105(1) observed zero encrypted computer network communications (e.g., packets) having a time delay of zero, 1,220 packets having a time delay of 1-10, 480 packets having a time delay of 11-30, etc.

Figures 8A, 8B:
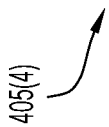
FIG. 8A is a table illustrating a histogram for an example Domain Name System (DNS) answer vector.
FIG. 8B illustrates the example DNS answer vector, according to an example embodiment.

Still another property of the encrypted computer network communications may include a protocol and a port of Domain Name System responses for a given Uniform Resource Locator (URL) or Internet Protocol (IP) address. DNS answer vector 405(4) may represent this information, as illustrated in FIGS. 8A and 8B. FIG. 8A is a table 800 illustrating a histogram for DNS answer vector 405(4), and FIG. 8B illustrates DNS answer vector 405(4). In this example, special purpose network-connected device 105(1) observed 44,000 DNS answers for TCP port 443. Special purpose network-connected device 105(1) observed no DNS answers transported using other protocols/ports.

To generate DNS answer vector 504(4), one or more received DNS answer packets are parsed. A DNS answer may map a destination URL address to another URL or IP address. This mapping may be stored in order to count the number of similar packet captures. In this example, only SSL/TLS packets are of interest. Since it cannot be determined whether the DNS answer relates to SSL/TLS traffic answer packet based on the DNS answer alone, the DNS answer is associated with its IP address/port. When the IP address/port is SSL/TLS related, the vector is updated accordingly.

FIGS. 9A-9C illustrate respective example histograms 900A-900C for alternative DNS answer vectors. In the example of FIG. 9A, a mapping of "adservice.google.nl" to "pagead46.1.doubleclick.net" is captured six times, and a mapping of "pagead46.1.doublekick.net" to "216.58.198.194" is captured three times. This corresponds to a stream from "173.38.200.100:4587" to "216.58.198.194:443." Histogram 900A is updated accordingly to reflect a total of nine counts for TCP port 443.

In FIG. 9B, a mapping of "adservice.google.nl" to "pagead46.1.doubleclick.net" is captured six times, and a mapping of "pagead46.1.doubleckick.net" to "216.58.198.194" is captured three times. This corresponds to a stream from "173.38.200.100:4587" to "216.58.198.194:443," and from "173.38.200.100:4587" to "216.58.198.194:563." Histogram 900B is updated accordingly to reflect a total of nine counts for TCP ports 443 and 563 each.

In FIG. 9C, a mapping of "adservice.google.nl" to "pagead46.1.doubleclick.net" is captured six times, a mapping of "pagead46.1.doubleckick.net" to "216.58.198.194" is captured three times, and a mapping of "google.com" to "215.62.198.193" is captured twice. This corresponds to a stream from "173.38.200.100:4587" to "216.58.198.194:443," from "173.38.200.100:4587" to "216.58.198.194:563," and from "173.38.200.100:4587" to "215.62.198.193:443." Histogram 900C is updated accordingly to reflect a total of eleven counts for TCP port 443 and nine counts for TCP port 563.

Figures 10A, 10B:
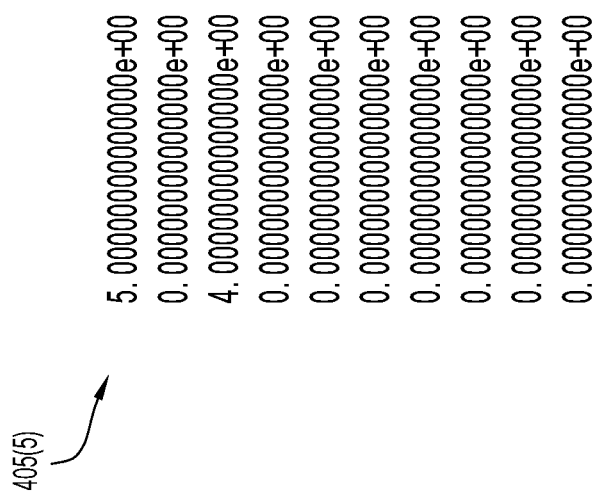
FIG. 10A is a table illustrating a histogram for an example error vector.
FIG. 10B illustrates the example error vector, according to an example embodiment.

Finally, another property of the encrypted computer network communications may include a number of dropped packets. Error vector 405(5) may represent this information, as illustrated in FIGS. 10A and 10B. FIG. 10A is a table 1000 illustrating a histogram for error vector 405(5), and FIG. 10B illustrates error vector 405(5). The error vector 405(5) may be determined based on a count of TCP error (e.g., a quantification/number of sequence number errors for a TCP session). In this example, special purpose network-connected device 105(1) observed five errors for TCP port 443, and four errors for TCP port 563. Special purpose network-connected device 105(1) observed no errors for the other transport protocols/ports.

Error vector 405(5) may be generated as follows. As a preliminary matter, drop packets cannot be used to directly determine a number of packets that were dropped (although a Linux kernel may count how many packets are dropped, the kernel does not track the type of dropped packet, and this count is only of packets dropped by the kernel). Therefore, errors are instead determined indirectly.

In one example, the TCP session is used (e.g., the TCP flags and TCP sequence number is checked, an error is discovered in the TCP sequence number or TCP flags, and the histogram in FIG. 10A is be updated accordingly). For example, three streams may be measured: "192.168.6.9" to "158.96.99.8:443"; "162.198.6.9" to "158.96.99.8:443"; and "192.168.6.9" to "158.96.99.8:563." The first stream has three missing sequence numbers, indicating that three packets were dropped. The second stream has two missing sequence numbers, indicating that two packets were dropped. The third stream has four missing sequence numbers, indicating that four packets were dropped. Histogram 1000 (and error vector 405(5)) are updated accordingly to reflect that there are five errors for TCP port 443, and four errors for TCP port 563.

Vectors 405(1)-405(5) relate to communications via SSL/TCP protocol. However, it will be appreciated that similar vectors may be determined based on a count of encrypted computer network communications according to any properties of the encrypted computer network communications. The properties may include, for example, the particular protocol in use (e.g., User Datagram Protocol (UDP), TCP, Point-to-Point Protocol (PPP), Simple Mail Transfer Protocol (SMTP), etc.), age, count, drops, and/or underlying encryption strategy (e.g., IP security (IPsec), Virtual Private Network (VPN), Transport Layer Security (TLS), SSL, etc.). Any suitable independent variables/patterns (e.g., any protocol or message that is protected by key 120(1)) may be used to determine information entropy.

Based on the count of the encrypted computer network communications (e.g., vectors 405(1)-405(5)), the special purpose network-connected device 105(1) may compute an information entropy of key 120(1). In one example, operator 410 may cause vectors 405(1)-405(5) to be joined into a super vector 415, as illustrated in FIG. 11. As shown, super vector 415 includes vectors 405(1)-405(5) vertically stacked on top of each other (i.e., protocol vector 405(1) stacked on top of payload size vector 405(2) stacked on top of time delay vector 405(3) stacked on top of DNS answer vector 405(4) stacked on top of error vector 405(5)).

Referring back to FIG. 4, the super vector 415 may be used to create a matrix with Discrete Cosine Transform (DCT) 420(1) and a matrix without DCT 420(2). The following operations illustrate how the super matrix with DCT 420(1) is created. Here, V=super vector 415, D=DCT of super vector 415 (e.g., DCT 2), N=normalized vector, and M=matrix with DCT 420(1). In this example, the matrix with DCT 420(1) is a square matrix.

$$\vec{D} = \text{dct}(\vec{V})$$

$$\vec{N} = \text{normalise}(\vec{D})$$

$$M = \vec{N} * \vec{N}^T$$

The following operations illustrate how the matrix without DCT 420(2) is created. Here, V=super vector 415, N=normalized vector, and M=matrix without DCT 420(2). In this example, the super matrix without DCT 420(2) is a square matrix.

$$\vec{N} = \text{normalise}(\vec{V})$$

$$M = \vec{N} * \vec{N}^T$$

As illustrated below, matrices 420(1) and 420(2) may be also/alternatively be created without normalization (not shown in FIG. 4). Here, V=super vector 415, D=DCT of super vector 415 (e.g., DCT 2), and M=matrix 420(1) or matrix 420(2).

$$\vec{D} = \text{dct}(\vec{V})$$

$$M = \vec{D} * \vec{D}^T$$

Vectors 405(1)-405(5) may also be used to generate respective matrices with DCT, without DCT, and without normalization. For example, protocol vector 405(1) may be used to create protocol matrix with DCT 425(1), protocol matrix without DCT 430(1), and protocol matrix without normalization 435(1). Protocol matrix with DCT 425(1) may be created using the following operations, where V=protocol vector 405(1), D=DCT of protocol vector 405(1), N=normalized vector, and M=protocol matrix with DCT 425(1).

$$\vec{D} = \text{dct}(\vec{V})$$

$$\vec{N} = \text{normalise}(\vec{D})$$

$$M = \vec{N} * \vec{N}^T$$

Protocol matrix without DCT 430(1) may be created using the following operations, where V=protocol vector 405(1), N=normalized vector, and M=protocol matrix without DCT 430(1).

$$\vec{N} = \text{normalise}(\vec{V})$$

$$M = \vec{N} * \vec{N}^T$$

Protocol matrix without normalization 435(1) may similarly be created using the following operations, where Here, V=protocol vector 405(1), D=DCT of protocol vector 405 (1), and M=protocol matrix without normalization 435(1).

$$\vec{D} = \text{dct}(\vec{V})$$

$$M = \vec{D} * \vec{D}^T$$

Respective matrices with DCT, without DCT, and without normalization may be calculated for vectors 405(2)-405(5) as well. Payload size vector 405(2) may be used to create payload size matrix with DCT 425(2), payload size matrix without DCT 430(2), and payload size matrix without normalization 435(2). Time delay vector 405(3) may be used to create time delay matrix with DCT 425(3), time delay matrix without DCT 430(3), and time delay matrix without normalization 435(3). DNS answer vector 405(4) may be used to create DNS answer matrix with DCT 425(4), DNS answer matrix without DCT 430(4), and DNS answer matrix without normalization 435(4). Error vector 405(5) may be used to create error matrix with DCT 425(5), error matrix without DCT 430(5), and error matrix without normalization 435(5).

Based on these respective matrices with DCT, without DCT, and without normalization, super matrices may be created. The direct sum of matrices 425(1)-425(5) (i.e., matrices with DCT) may create super matrix with DCT 440. The direct sum of matrices 430(1)-430(5) (i.e., matrices without DCT) may create super matrix without DCT 445. The direct sum of matrices 435(1)-435(5) (i.e., matrices without normalization) may create super matrix without normalization 450. Due to the nature of direct sums, super matrices (e.g., super matrix 440) may be created even if the component matrices (e.g., matrices 425(1)-425(5)) have unequal dimensions.

The following example illustrates a direct sum of matrices 425(1)-425(5) to create super matrix 440. Super matrices 445 and 450 may be similarly created. Here, $M_1$=protocol matrix with DCT 425(1), $M_2$=payload size matrix with DCT 425(2), $M_3$=time delay matrix with DCT 425(3), $M_4$=DNS answer matrix with DCT 425(4), and $M_5$=error matrix with DCT 425(5).

$$M = M_1 \oplus M_2 \oplus M_3 \oplus M_4 \oplus M_5$$

Matrices 420(1) and 420(2) and super matrices 440, 445, 450 may each be used to create a respective transpose matrix and correlation matrix. Matrix with DCT 420(1) may be used to create transpose matrix 455(1) and correlation matrix 460(1). Matrix without DCT 420(2) may be used to create transpose matrix 455(2) and correlation matrix 460(2). Super matrix with DCT 440 may be used to create transpose matrix 455(3) and correlation matrix 460(3). Super matrix without DCT 445 may be used to create transpose matrix 455(4) and correlation matrix 460(4). Super matrix without normalization 450 may be used to create correlation matrix 460(5).

A transpose matrix may be generated using the following example. Here, M=matrix with DCT 420(1), and T=transpose matrix 455(1). This example may similarly apply to matrices 420(2), 440, and/or 445.

$$T = M * M^T$$

A correlation matrix may be calculated by multiplying a matrix by its inverse, as illustrated below. Here, M=matrix with DCT 420(1), T=transpose matrix 455(1), and C=correlation matrix 460(1). This example may similarly apply to matrices 420(2), 440, 445, and/or 450.

$$T = M * M^T$$

$$C = \text{correlation}(T)$$

Transpose matrices 455(1)-455(4) and correlation matrices 460(1)-460(5) may each be used to create respective square matrices 465(1)-465(9). A square matrix may be generated using the following example. Here, M=one of transpose matrices 455(1)-455(4) or correlation matrices 460(1)-460(5), and S=one of square matrices 465(1)-465(9).

$$S = M^2$$

As shown below, each of the square matrices 465(1)-465(9) may be vectorized to create respective entropy vectors 470(1)-470(9). Here, V=one of entropy vectors 470(1)-470(9), and S=one of square matrices 465(1)-465(9).

$$V = \text{vectorise}(S)$$

The information entropy of a key (e.g., key 120(1)) may be computed based on entropy vectors 470(1)-470(9). In particular, computing the information entropy may include summing respective products of (1) respective elements of one of entropy vectors 470(1)-470(9), and (2) respective logarithms of the respective elements of one of entropy vectors 470(1)-470(9). This is shown below, where E=information entropy, and $v_i$=element i of one of entropy vectors 470(1)-470(9).

$$E = -\sum_{i=1}^{n} v_i * \log v_i$$

A number of different types of information entropy may be dynamically computed: entropy for super vector transpose matrix 475(1), entropy for super vector correlation matrix 475(2), entropy for super vector transpose matrix without DCT 475(3), entropy for super vector correlation matrix without DCT 475(4), entropy for super matrix transpose matrix 475(5), entropy for super matrix correlation matrix 475(6), entropy for super matrix transpose matrix without DCT 475(7), entropy for super matrix correlation matrix without DCT 475(8), and entropy for super matrix correlation matrix without normalization 475(9). Any one or more of these types of information entropy may be used to determine the predicted threat level of the key 120(1).

The following example illustrates generating information entropy for super matrix correlation matrix 475(6) in accordance with method 400. Here, $V_1$=protocol vector 405(1), $V_2$=payload size vector 405(2), $V_3$=time delay vector 405 (3), $V_4$=DNS answer vector 405(4), $V_5$=error vector 405(5), D=DCT vector, N=normalized vector, $M_1$=protocol matrix with DCT 425(1), $M_2$=payload size matrix with DCT 425 (2), $M_3$=time delay matrix with DCT 425(3), $M_4$=DNS answer matrix with DCT 425(4), $M_5$=error matrix with DCT 425(5), M=super matrix 440, T=transpose matrix 455(3), C=correlation matrix 460(3), S=square matrix 465(6), V=entropy vector 470(6), and E=entropy for super matrix correlation matrix 475(6).

$\vec{D} = dct(\vec{V}_1)$ $\vec{N} = \text{normalise}(\vec{D})$ $M_1 = \vec{N} * \vec{N}^T$ $\vec{D} = dct(\vec{V}_2)$ $\vec{N} = \text{normalise}(\vec{D})$ $M_2 = \vec{N} * \vec{N}^T$ $\vec{D} = dct(\vec{V}_3)$ $\vec{N} = \text{normalise}(\vec{D})$ $M_3 = \vec{N} * \vec{N}^T$ $\vec{D} = dct(\vec{V}_4)$ $\vec{N} = \text{normalise}(\vec{D})$ $M_4 = \vec{N} * \vec{N}^T$ $\vec{D} = dct(\vec{V}_5)$ $\vec{N} = \text{normalise}(\vec{D})$ $M_5 = \vec{N} * \vec{N}^T$ $M = M_1 \oplus M_2 \oplus M_3 \oplus M_4 \oplus M_5$ $T = M * M^T$ $C = \text{correlation}(T)$ $S = C^2$ $V = \text{vectorise}(S)$ $E = -\sum_{i=1}^{n} V_i * \log V_i$ An alternative method for calculating information entropy from vectors 405(1)-405(5) is provided below.

Figure 12:
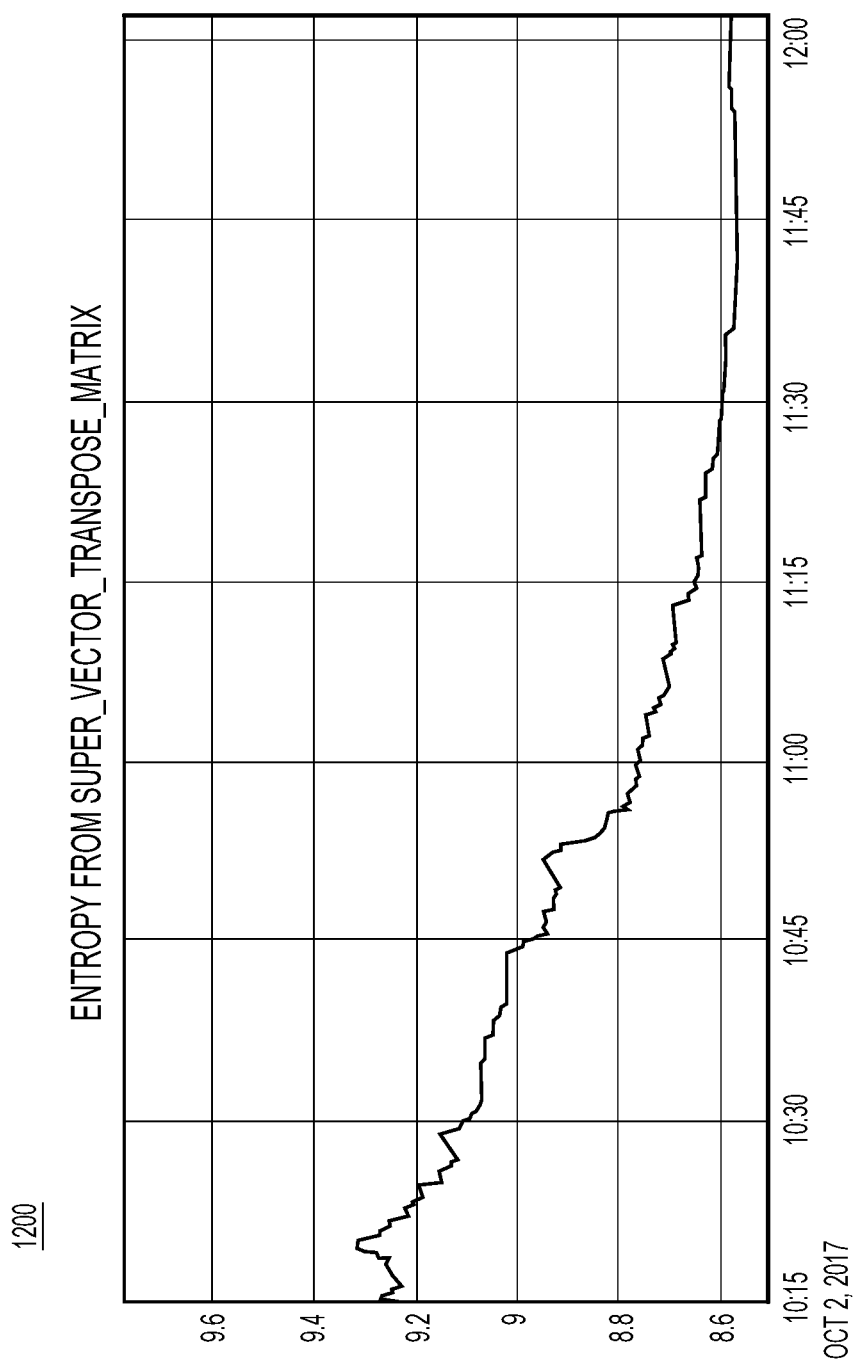
FIG. 12 is a plot illustrating entropy from a super vector transpose matrix, according to an example embodiment.

$\vec{v}_1 = DCT(\vec{v}_1)$ $\vec{v}_2 = DCT(\vec{v}_2)$ $\vec{v}_3 = DCT(\vec{v}_3)$ $\vec{v}_4 = DCT(\vec{v}_4)$ $\vec{v}_5 = DCT(\vec{v}_5)$ $\hat{v}_1 = \frac{v_1}{|v_1|}$ $\hat{v}_2 = \frac{v_2}{|v_2|}$ $\hat{v}_3 = \frac{v_3}{|v_3|}$ $\hat{v}_4 = \frac{v_4}{|v_4|}$ $\hat{v}_5 = \frac{v_5}{|v_5|}$ $\vec{v}_1 = \hat{v}_1^2$ $\vec{v}_2 = \hat{v}_2^2$ $\vec{v}_3 = \hat{v}_3^2$ $\vec{v}_4 = \hat{v}_4^2$ $\vec{v}_5 = \hat{v}_5^2$ $M_1 = \vec{v}_1 * \vec{v}_1^T$ $M_2 = \vec{v}_2 * \vec{v}_2^T$ $M_3 = \vec{v}_3 * \vec{v}_3^T$ $M_4 = \vec{v}_4 * \vec{v}_4^T$ $M_5 = \vec{v}_5 * \vec{v}_5^T$ $M = M_1 \oplus M_2 \oplus M_3 \oplus M_4 \oplus M_5$ $C = M * M^{-1}$ $V = \text{vectorise}(S)$ $E = -\sum_{i=1}^{n} v_i * \log v_i$ FIG. 12 is a plot 1200 illustrating entropy for super vector transpose matrix 475(1). As shown, the information entropy decreases over time as more information about the key is potentially discovered. This is consistent with the behavior of the information entropy shown in the plot of FIG. 3, for example.

Figure 13:
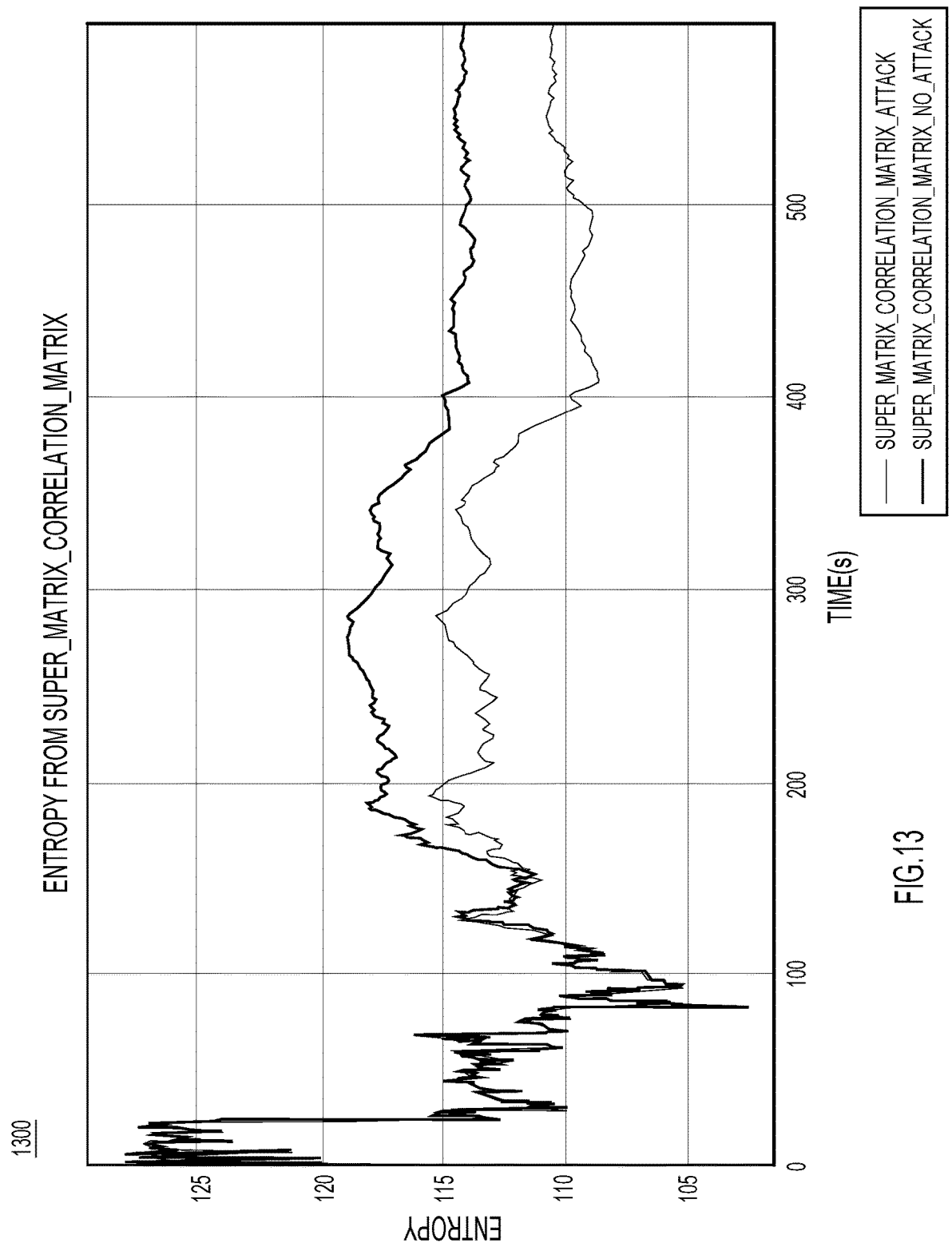
FIG. 13 is a plot illustrating entropy from a super matrix correlation matrix during an attack and during no attack, according to an example embodiment.

FIG. 13 is a plot 1300 illustrating information entropy for super matrix correlation matrix 475(6) for two identical keys (e.g., keys 120(1) and 120(2)). In this example, one of the keys is under attack, and the other key is not under attack. The information entropy of the key under attack is lower than the key not under attack because more information is available for the key under attack. The difference in entropy between the two keys reflects the amount of additional exposure of the key under attack.

Figure 14:
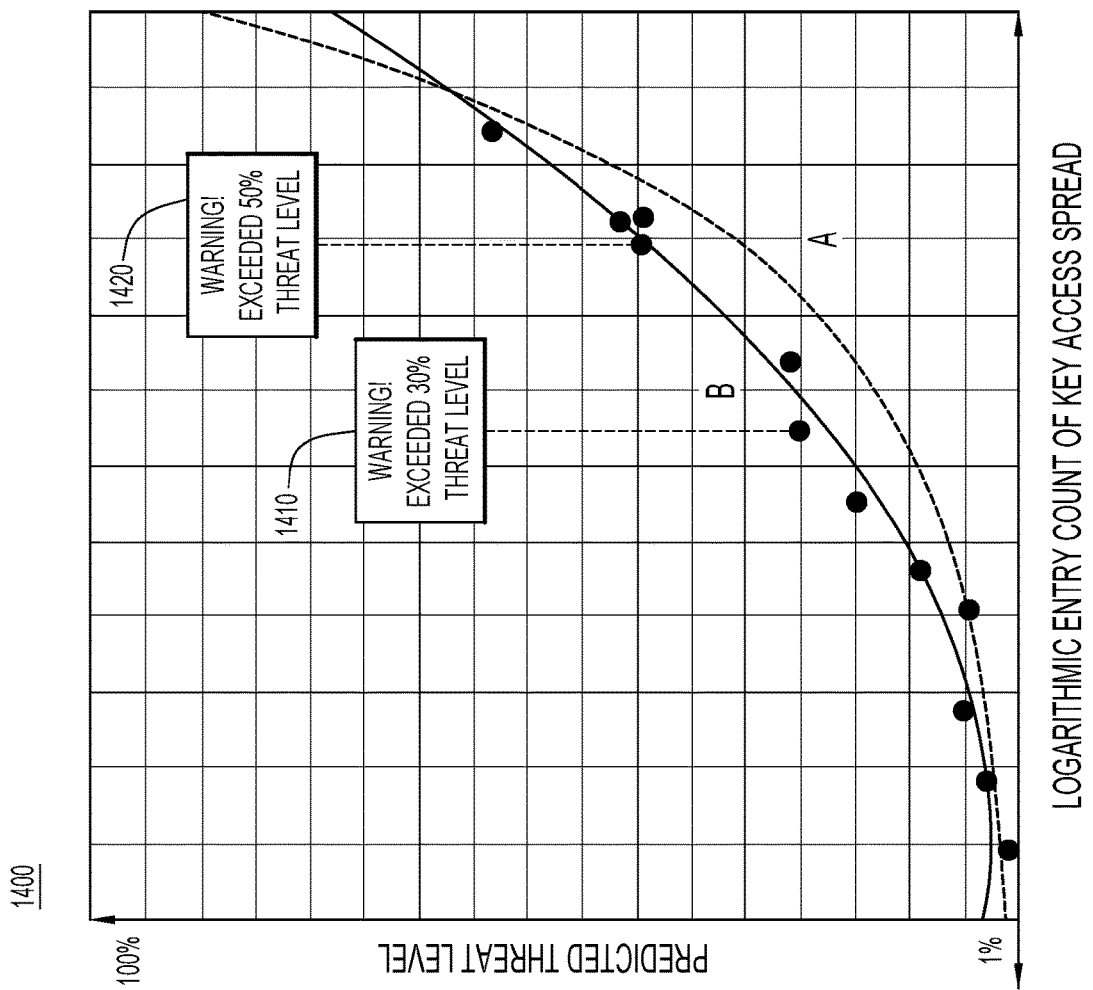
FIG. 14 is a plot illustrating the relationship between usage of a key and a predicted threat level of the key, according to an example embodiment.

FIG. 14 is a plot 1400 illustrating a predicted threat level for key 120(1) relative to the logarithmic entry count of key access spread. The x-axis represents the logarithmic query (entropy entry) for a predicted threat level (e.g., arbitrary percent threat), which is represented by the y-axis. In this example, the query is cumulative of access to the private key, and the predicted threat level is a monotonically increasing number from 0.1 to 0.99. The spread is a model estimation of a number of potential underlying variables (e.g., sources and destinations). In particular, two curves (A and B) are shown. Curve A may be a preset exponential graph (e.g., assumed threat level), and curve B may be the empirically determined (predicted) threat level for key 120(1). A user device (e.g., IoT device 105(1)) may display plot 1400 with warnings 1410 and 1420 indicating that certain thresholds have been reached (e.g., 30% threat level, 50% threat level, etc.)

The predicted threat level shown in FIG. 14 may be used to generate one of the values under "% Life" in list 200 (FIG. 2). For example, if the predicted threat level is 90%, the corresponding percent life may be 100%−90%=10%, as shown in FIG. 2. The predicted threat level (and percent life) for key 120(1) may be dynamically updated over time as the entry count of key access (e.g., for key 120(1)) increases.

In the paradigm of information theory, information may be aggregated. In the case of thousands of IoT devices, each local information entropy calculated for each IoT device may be different based on each individual usage. Entropy may be aggregated across the thousands of IoT devices and shared across each IoT device. If these thousands of IoT devices have an established sharing mechanism, an individual device may have the entropy of key usage at a global scale. The way information entropy is merged globally may be reflected, for example, in the super matrix calculations described herein.

In one example, special purpose network-connected device 105(1) is one of a plurality of identical special purpose network-connected devices 105(1)-105(3). Each identical special purpose network-connected device 105(1)-105(3) may be sold/shipped pre-configured with (e.g., storing) identical keys 120(1)-120(3). Because every identical special purpose network-connected device 105(1)-105(3) uses identical keys 120(1)-120(3), the time-to-live for keys 120(1)-120(3) may be lower than if only special purpose network-connected device 105(1) used the key 120(1). The existence of identical keys 120(1)-120(3) may prompt multipliers of the entropy index.

Accordingly, the special purpose network-connected device 105(1) may receive, from at least one of the plurality of special purpose network-connected devices (e.g., special purpose network-connected device 105(2)), an indication of a local information entropy of the key 120(2). The local information entropy of the key 120(2) may be locally computed at special purpose network-connected device 105(2). The special purpose network-connected device 105(1) may compute a global information entropy of the key 120(1) based on the local information entropy received from special purpose network-connected device 105(2). Local information entropy may be shared as a value (e.g., a value for local information entropy), raw data (e.g., vectors), matrices, etc.

Figure 15:
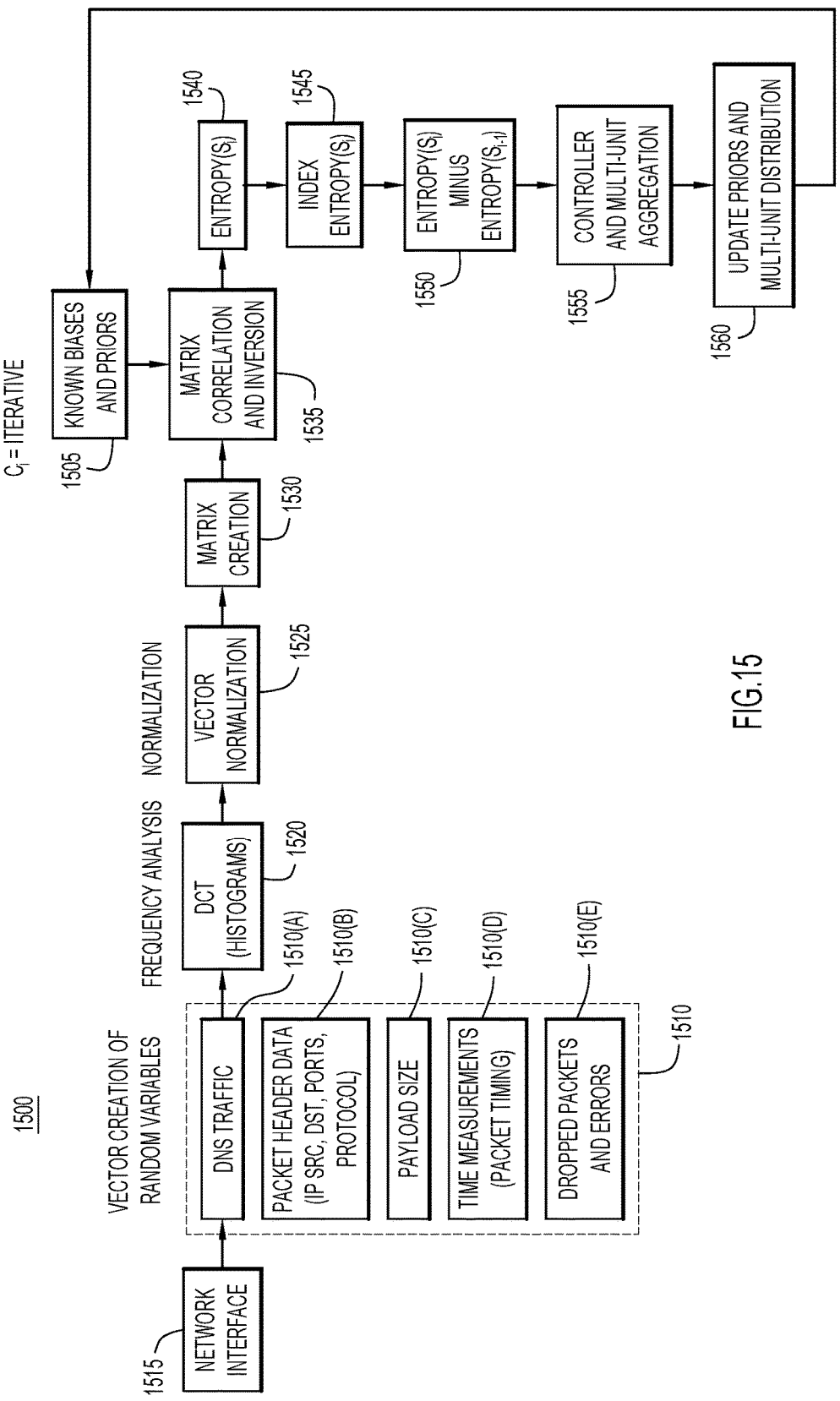
FIG. 15 illustrates a flowchart for an alternate calculation of the information entropy of a key, according to an example embodiment.

FIG. 15 illustrates a flowchart 1500 for an alternate calculation of the information entropy of a key, according to an example embodiment. In the following description, the term "packets" refers to either IP packets (Layer 2) or Layer 1 frames in analog devices (e.g., frames on a Controller Area Network (CAN) bus). A packet may simply mean an encapsulation of a message with a header.

At 1505, a network device may configure biases and priors regarding the statistical distribution of similar network devices (e.g., the number of similar network devices that have been deployed). These priors may establish an acceleration measure of the detectability of a private key, given that the key exists elsewhere on other network devices. For example, endpoint devices (e.g., IP cameras, Digital Video Recorders (DVRs), thermostats, etc.) are often manufactured in the millions. The bias is thus calculated such that one external entity (i.e., the threat) may, using private or other arbitrary settings, attempt to build enough statistics (priors) about the network devices before breaking into a particular target device. Biases and priors are the origin of the private key spread, an exponentially growing function calculated based on its inherit design.

At 1510, a network device gathers data using network interface 1515 and prepares the data. As shown at 1510(A), incoming and/or outgoing packets are processed for DNS entry (if any) and the originating DNS service. As shown at 1510(B), incoming and/or outgoing packets are processed for their IP sources, destinations, ports, and protocols. As shown at 1510(C), incoming and/or outgoing packets are processed for payload size. This analysis may be session-based and involve analyzing the packets for their payload sizes. As shown at 1510(D), incoming and/or outgoing packets are processed for the time delay in packet sequences. This analysis may be session based and involve processing the packets for any delay among packets. As shown at 1510(E), incoming and/or outgoing packets are processed for dropped packet frequency and spread. An output of the analysis is one or more vector entries in a mathematical matrix representing a count and frequency of request, represented by the coefficient of the corresponding DCT. This is shown at 1520. At 1525, vectors may be normalized and/or quantized.

Operations 1530-1555 may comprise a resolution and sensitivity component to normalize the size of a super matrix that represents many vectors (dimensions). At 1530, a super matrix is created and dimensioned based on the variables identified at 1510. At 1535, a correlation matrix may be generated from the super matrix by multiplying the super matrix by its inverse. At 1540, the entropy of the correlation matrix may be computed. The entropy calculation may be an exponent calculation based on the multiplication series of all components (e.g., $E(vector)=e^x*e^y*e^z$, where x, y, and z are the coefficients from the correlation matrix). At 1545, the output of the entropy calculation (e.g., a coefficient vector) may be recorded in a fast lookup index or hash table. At 1550, any differences from the index or hash table may be determined and, at 1555, the differences are reported to a controller, if available on the network.

At 1560, a local controller on the network device may recalculate and combine entropy as a global vector computed based on the bias and priors spread of deployment, manufacturing, and configuration, as well as commonality (i.e., different network devices using the same key).

Figure 16:
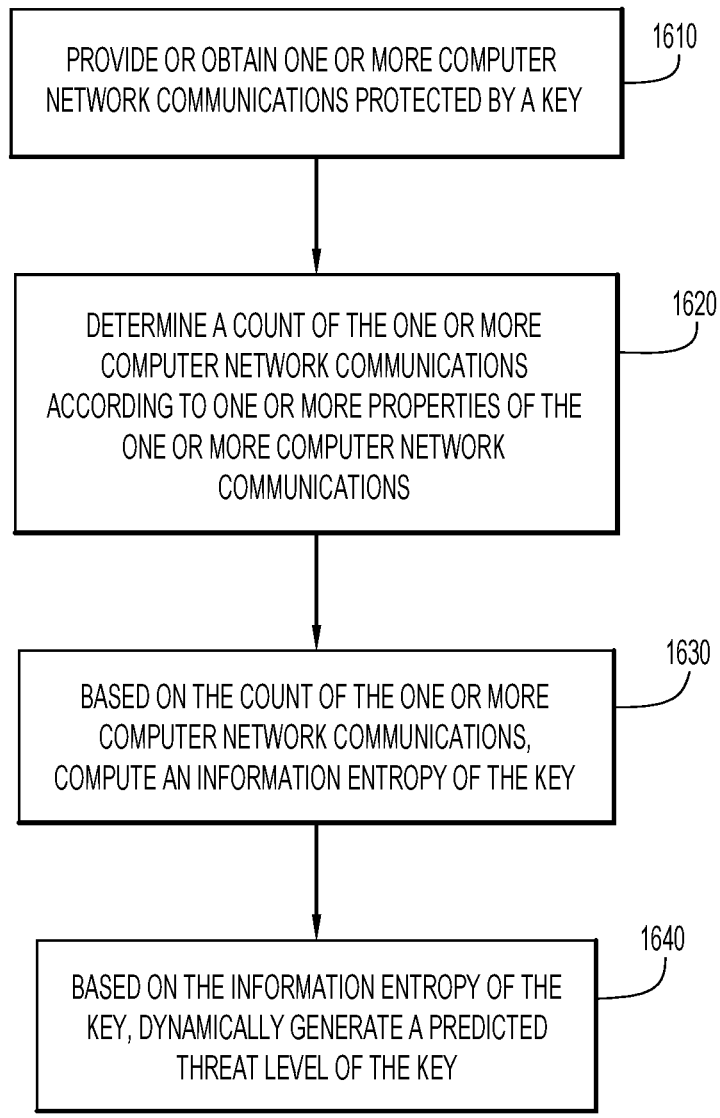
FIG. 16 illustrates a flowchart of a method for key threat prediction, according to an example embodiment.

FIG. 16 is a flowchart of a method 1600 for key threat prediction. The method may be performed at a network-connected device (e.g., special purpose network-connected device 105(1)). At 1610, the network-connected device provides or obtains one or more computer network communications protected by a key. At 1620, the network-connected device determines a count of the one or more computer network communications according to one or more properties of the one or more computer network communications. At 1630, based on the count of the one or more computer network communications, the network-connected device computes an information entropy of the key. At 1640, based on the information entropy of the key, the network-connected device dynamically generates a predicted threat level of the key.

In response to determining that the predicted threat level has reached a threshold, a user may take action (e.g., replacing the key) to mitigate the threat. The key may be replaced at a given predicted remaining life of the key based on the risk analysis of the particular use case or audit requirements.

In one example, threat prediction logic 125 may include at least two components: the data component and the controller. In one example, the data component captures and analyzes data from the network, creates vectors (e.g., vectors 405(1)-405(5)) from the captured data, creates matrices (e.g., matrices 425(1)-425(5), 430(1)-430(5), 435(1)-435(5)) from the vectors, and generates a super matrix (e.g., super matrix 440, 445, and/or 450) from the matrices. The data component may calculate the information entropy from the super matrix and send the information entropy to the controller to plot/display. In another example, the controller may capture a vector produced from a vectorized matrix (e.g., entropy vector 470(1)-470(9)), calculate the information entropy from the vector, and plot/display the information entropy.

An example protocol for sending the vector produced from the vectorized matrix (e.g., entropy vector 470(1)-470(9)) to the controller is provided as follows. It will be appreciated that any suitable protocol may be used.

```
struct__attribute__((__packed__)) packet_header_t {
    uint8_t packet_type; -- New, update, drop,...
    uint8_t matrix_type; -- Matrix type (with DCT, without DCT, ...)
```

```
    uint32_t lenght; -- data lengh
    struct entropy_position_t data[0]; -- data
};
struct entropy_position_t {
    int diff; -- position data in vector
    double value; -- value
};
```

A private key threat detection mechanism in a system may be primarily attached to a network. This edge analytics mechanism maintains a matrix representation that is updated every time the key is accessed through the network. The logic to implement this mechanism may run on a device (e.g., an IoT device) as embedded software. This logic may run locally on the device with a minimal footprint. It will be appreciated that the operations involved in performing any methods described herein are not necessarily limited to any particular sequential order.

In one example, a gateway (e.g., Access Point) may be equipped with logic to generate a predicted threat level (e.g., threat percent index) using the information entropy of a key. Threats to the life, use, and span of the gateway may thus be assessed by reading the predicted threat level.

The computation of the entropy of a threat may be derived as follows. First, for all entries, Threat Index=Cumulative Sum in the order exponential function of all signatures (DCT). Second, the spread of the entropy may be calibrated based on the specified risk to which the particular device is set.

The techniques described herein may apply to symmetric or asymmetric, and public or private, keys. In the case of symmetric keys, both parties and a key server may know the key. In a Public Key Infrastructure (PKI), there are deployments in which a Certification Authority (CA) or Registration Authority (RA) may issue both the public/private key pairs. To prevent an attacker from taking advantage of a broken key, keys are conventionally updated/replaced periodically. However, such conventional approaches risk replacing the keys too infrequently. For example, PKI type keys are potentially threatened by private key recovery or decoding due to the infrequency of key updates. In the case of special purpose network-connected devices, symmetric keys may also be updated infrequently.

If the key is compromised, and the event was captured as a compromise by the IoT device, this information may decrease the entropy, pushing the percent life left close to zero. Thus, knowledge that can compromise the key may affect the information entropy. These techniques lay the foundation to counter malicious attacks and secure systems that need to evolve in their lifecycle.

Enterprise use cases for these techniques may include compliance/audit datasets, cyber datasets, and/or network management/assurance datasets. Virtual Machines (VMs) (e.g., <100 Mb Random Access Memory (RAM)) may be distributed to, and run efficiently on, endpoints such as APs, edge routers, IoT devices, etc. These endpoints may observe communications at the network or the application layer. For example, if a key protects an application (as opposed to a network), messages pertaining to that application may be observed. These techniques may be applied to all layers of the Open Systems Interconnection (OSI) stack that utilize keys for session/application authentication of communications protections (e.g., encryption).

The software-based techniques presented herein develop probabilistic models of the validity/security of a private key using key usage and access indicators at a particular device. The software logic may employ embedded machine learning (ML) of key usage in a system or a network in order to indicate whether the private key has been compromised. Since a key becomes vulnerable over its lifecycle and usage, these techniques track the existence of monotonically growing threats based on usage and/or access of keys. The threat is determined based on statistical analysis assessing the risk to which a key is subjected.

These techniques protect keys stored in any environment. Mechanisms for detecting threats to keys may involve using ML embedded at the edge and utilized as a runtime process to monitor all access to the key. These techniques address use cases for the minimum configuration of networked devices (i.e., devices that include a processor and memory for computational needs). A software embedded solution and runtime approach are provided that reduce the burden of hardware or software refurbishing with new private keys. As explained in greater detail below, this may be applied to various use cases, security verticals, and architectural environments in enterprises and service provider environments as well as IoT switches and gateways.

Performance characteristics on computational columns and unsupervised training may be measured. These approaches may lead to improved performance and reduced cycle time compared to traditional big data approaches.

These techniques may involve unsupervised ML leading to pattern encoding with lookup (hash or indexed), and/or inverse covariance models. ML typically involves Business Intelligence (BI) reporting, simple correlations, and/or parallel processed correlation and cross correlation computations. In certain other situations, searching multiple terabytes of data is required to implement AI. Neural network approaches, although significantly advanced over the years, still suffer from the problem of needing large training sets and over-fitting.

Unsupervised learning runs without any human attendance in the algorithms, math, rules, and characteristics of the interrogation techniques. These approaches work well across data and identify relationships without ML training due to the data edge surgical scoring approaches. The calculation of the risk of private key compromise is a multi-variate problem in which the solution space is not known a priori. That is, the nature, type, and approach of possible attacks are not known a priori. Unsupervised learning may be used to address this problem.

Reinforcement learning, which is a relatively new area of study in ML, is well-suited for such a problem. Reinforcement learning provides the capability to handle unsupervised auxiliary input without biasing the base models learnt by the engine while allowing for identifying outlier situations.

Statistical shaping may increase the accuracy and intelligence in scoring the risk and/or threat associated with the private key. This mathematical approach of computation may be the end result (output) of the logic running on the platform, and may improve the accuracy of the ML engine running off the platform.

Multiple (e.g., two, three, etc.) unsupervised ML techniques may be implemented in parallel to allow for symbiotic training, deep learning, and adaptiveness. Deep learning may be used to adapt and learn about private key usage and anomaly use prevention. The unsupervised approach is often efficient for feature identification, non-obvious data connections, and unsupervised modeling approaches, thus providing the potential for positively impacting productivity.

Accordingly, embedded ML may be used for private key usage in a system or a network. In addition, runtime access to the embedded private key may be provided. Private key analytics models may be applied to Software Defined Networking (SDN) for analytics model exchanges (orchestration).

In one example, unsupervised learning for a state machine may use multivariable Bayesian algorithms with sparse matrices for inverse covariance persistence. This environment may build on multiple incoming patterns, and with additional variables such as frequencies and session length.

This may apply to various IoT edge use cases, such as connected vehicle energy/utilities, oil and gas, and manufacturing. Embedded binaries may be built for edge devices (e.g., connect grid router, integrated services routers, etc.) that perform private key assurance monitoring and local anomaly detection. Tampering of far edge communication and compute devices may thus be prevented. This may apply in various use cases, such as in transportation and asset tracking for military and civil use.

These techniques may provide embedded endpoint self-protection, leading to sustaining approaches for long running periods over multiple years. The software may run/operate in the embedded environment, container, Operating System (OS), etc., to avoid the heavy investment of big data analytics clouds. Runtime may relate to conducting the learning and security threat as a measured part of the exposure risks at the edge.

Provided herein are mechanisms for data collection and evaluation based on the usage of the key. The analytics may be based on Information Theory. The amount of information collected by simply touching the key is measured. A network interface may be used to measure such information about access as reflected in an entropy index. The entropy may be inversely proportional to the order of the certainty. The more certainty, the lower the entropy. Thus, these techniques focus on key usage, and convert trials/attempts into a form of information presented as entropy.

It is to be understood that a threat level may be based on many factors and many indicators. The overuse of keys may be one such factor, as opposed to being the sole factor indicator of over-usage. The keys themselves may distinguish/define another co-factor. Specific threats to keys may be analyzed, but the co-factor of key usage that can lead to a threat determination may also be used. The co-factor may be arbitrarily modeled, for example, as a function of the information entropy and the key entropy as the threat index. A threat is a complex evaluation and may be represented as a function of the key/combination/strength as well as usage. Overuse of a key may be used as an arbitrary cutoff factor set on the information index as described by its entropy.

The choice of what constitutes a "threat" to some application may involve selecting an arbitrary number that takes into consideration other factors such as key strength, but also deployment size and other variables. Addressing the security atomically, and at the edge, may provide added value. For large scale deployment cases with multiple endpoints, the function may aggregate each atomic piece of information.

In one form, a method is provided. The method comprises: at a network-connected device: providing or obtaining one or more computer network communications protected by a key; determining a count of the one or more computer network communications according to one or more properties of the one or more computer network communications; based on the count of the one or more computer network communications, computing an information entropy of the key; and based on the information entropy of the key, dynamically generating a predicted threat level of the key.

In another form, an apparatus is provided. The apparatus comprises: a network interface configured to provide or obtain one or more computer network communications protected by a key; and one or more processors coupled to the network interface, wherein the one or more processors are configured to: determine a count of the one or more computer network communications according to one or more properties of the one or more computer network communications; based on the count of the one or more computer network communications, compute an information entropy of the key; and based on the information entropy of the key, dynamically generate a predicted threat level of the key.

In another form, one or more non-transitory computer readable storage media are provided. The non-transitory computer readable storage media are encoded with instructions that, when executed by a processor of a network-connected device, cause the processor to: provide or obtain one or more computer network communications protected by a key; determine a count of the one or more computer network communications according to one or more properties of the one or more computer network communications; based on the count of the one or more computer network communications, compute an information entropy of the key; and based on the information entropy of the key, dynamically generate a predicted threat level of the key.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a network-connected device:
      providing or obtaining a plurality of computer network communications protected by a key;
      determining a count of the plurality of computer network communications according to one or more properties of the plurality of computer network communications;
      based on the count of the plurality of computer network communications, computing an information entropy of the key; and
      based on the information entropy of the key, dynamically generating a predicted threat level of the key.

2. The method of claim 1, wherein the one or more properties of the plurality of computer network communications includes a protocol used for transporting the plurality of computer network communications and a source or destination port of the plurality of computer network communications.

3. The method of claim 1, wherein the one or more properties of the plurality of computer network communications includes a payload size of the plurality of computer network communications.

4. The method of claim 1, wherein the one or more properties of the plurality of computer network communications includes a time delay in a packet sequence of the plurality of computer network communications.

5. The method of claim 1, wherein the one or more properties of the plurality of computer network communications includes a protocol and a port of Domain Name System responses.

6. The method of claim 1, wherein the one or more properties of the plurality of computer network communications includes a number of dropped packets.

7. The method of claim 1, further comprising:
generating a notification of the predicted threat level of the key.

8. The method of claim 1, wherein the network-connected device is a special purpose network-connected device of a plurality of special purpose network-connected devices, the plurality of special purpose network-connected devices each storing the key, the method further comprising obtaining, from at least one of the plurality of special purpose network-connected devices, an indication of a local information entropy of the key, and wherein computing the information entropy of the key includes computing a global information entropy of the key based on the local information entropy of the key.

9. The method of claim 1, wherein providing or obtaining the plurality of computer network communications includes sending or receiving the plurality of computer network communications.

10. An apparatus comprising:
a network interface configured to provide or obtain a plurality of computer network communications protected by a key; and
one or more processors coupled to the network interface, wherein the one or more processors are configured to:
determine a count of the plurality of computer network communications according to one or more properties of the plurality of computer network communications;
based on the count of the plurality of computer network communications, compute an information entropy of the key; and
based on the information entropy of the key, dynamically generate a predicted threat level of the key.

11. The apparatus of claim 10, wherein the one or more properties of the plurality of computer network communications include a protocol used for transporting the plurality of computer network communications and a source or destination port of the plurality of computer network communications.

12. The apparatus of claim 10, wherein the one or more properties of the plurality of computer network communications includes a payload size of the plurality of computer network communications.

13. The apparatus of claim 10, wherein the one or more properties of the plurality of computer network communications includes a time delay in a packet sequence of the plurality of computer network communications.

14. The apparatus of claim 10, wherein the one or more properties of the plurality of computer network communications includes a protocol and a port of Domain Name System responses.

15. The apparatus of claim 10, wherein the one or more properties of the plurality of computer network communications includes a number of dropped packets.

16. One or more non-transitory computer readable storage media encoded with instructions that, when executed by a processor of a network-connected device, cause the processor to:
provide or obtain a plurality of computer network communications protected by a key;
determine a count of the plurality of computer network communications according to one or more properties of the plurality of computer network communications;
based on the count of the plurality of computer network communications, compute an information entropy of the key; and
based on the information entropy of the key, dynamically generate a predicted threat level of the key.

17. The one or more non-transitory computer readable storage media of claim 16, wherein the one or more properties of the plurality of computer network communications includes a protocol used for transporting the plurality of computer network communications and a source or destination port of the plurality of computer network communications.

18. The one or more non-transitory computer readable storage media of claim 16, wherein the one or more properties of the plurality of computer network communications includes a payload size of the plurality of computer network communications.

19. The one or more non-transitory computer readable storage media of claim 16, wherein the one or more properties of the plurality of computer network communications includes a time delay in a packet sequence of the plurality of computer network communications.

20. The one or more non-transitory computer readable storage media of claim 16, wherein the one or more properties of the plurality of computer network communications includes a protocol and a port of Domain Name System responses.

* * * * *